United States Patent [19]
Kehl et al.

[11] Patent Number: 4,650,363
[45] Date of Patent: Mar. 17, 1987

[54] BALL JOINT FOR A BRAKE BOOSTER

[75] Inventors: Georg Kehl, Stuttgart; Arnold Pahl, Markgröningen; Ernst-Dieter Schafer, Pliezhausen; Heinz Siegel, Stuttgart, all of Fed. Rep. of Germany

[73] Assignee: Robert Bosch GmbH, Stuttgart, Fed. Rep. of Germany

[21] Appl. No.: 866,556

[22] Filed: May 23, 1986

[30] Foreign Application Priority Data
Sep. 13, 1985 [DE] Fed. Rep. of Germany ....... 3532769

[51] Int. Cl.⁴ .......................... F16C 3/00; F16C 11/00
[52] U.S. Cl. ...................................... 403/140; 92/129; 403/135
[58] Field of Search ............... 403/135, 140, 143, 123, 403/125, 124, 126; 92/129, 167

[56] References Cited
U.S. PATENT DOCUMENTS
3,733,966  5/1973  Brown, Jr. ............................ 91/372

FOREIGN PATENT DOCUMENTS
1276271  10/1961  France ................................. 403/140
1511672  of 1978  United Kingdom .

Primary Examiner—Andrew V. Kundrat
Attorney, Agent, or Firm—Edwin E. Greigg

[57] ABSTRACT

A ball joint that cannot be disassembled intended for use in a brake booster. The ball joint comprises a first, substantially rod-like component, which has a ball head; a second component, which has an insertion opening, which narrows in funnel-like fashion in the area of its beginning and is provided with an annular groove spaced apart from the beginning, a radially elastic securing ring, which is insertable into the insertion opening and lockable into place in the annular groove, as well as a sleeve, which has an annular groove for receiving the securing ring during the insertion into the insertion opening until it locks into place in the detent provided by the annular groove of the outer component. The sleeve surrounds the ball head in an articulated and undetachable manner.

7 Claims, 1 Drawing Figure

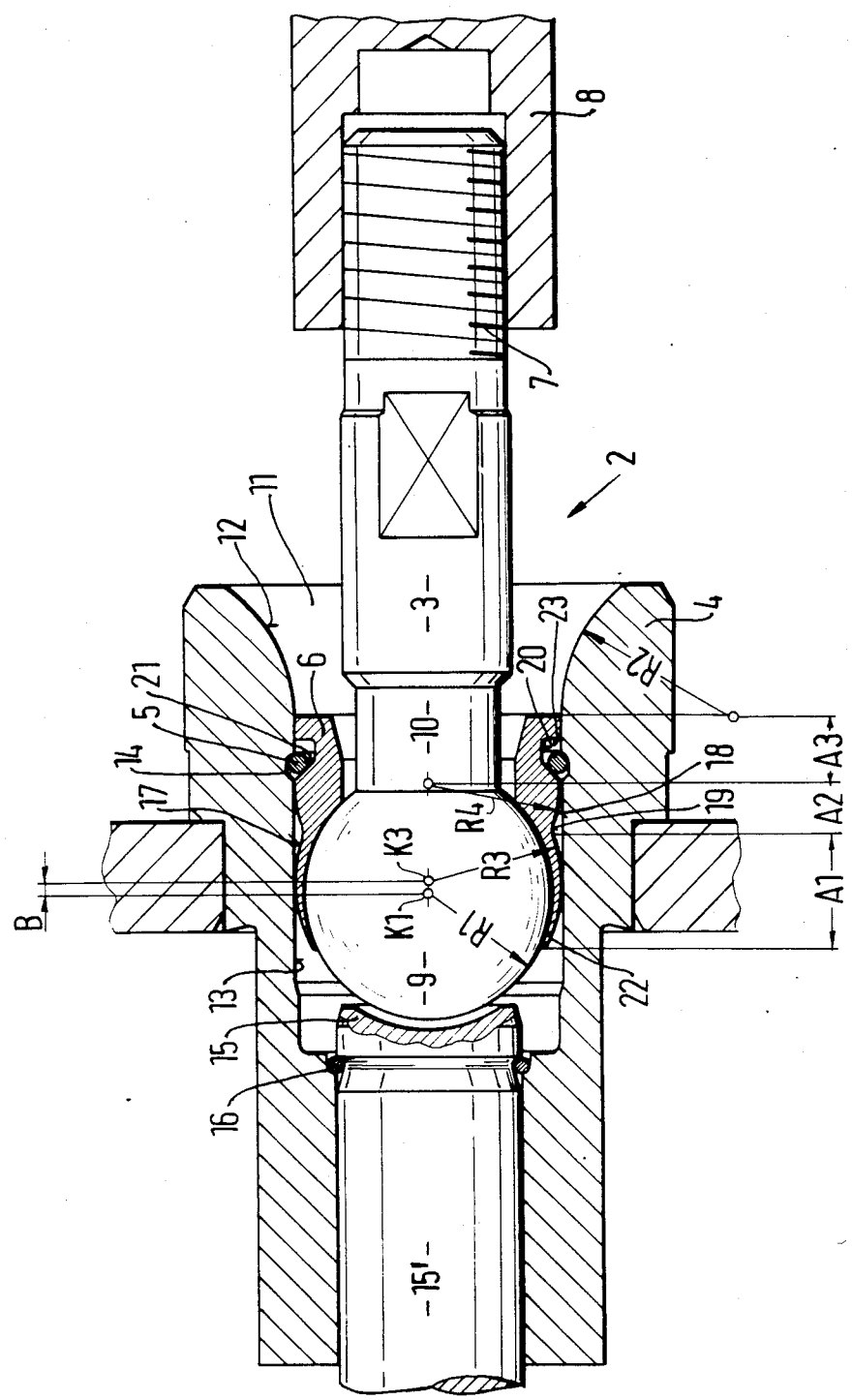

BALL JOINT FOR A BRAKE BOOSTER

BACKGROUND OF THE INVENTION

The invention is based on a ball joint for a brake booster. British Patent No. 1,511,672 discloses a ball joint, which comprises a first component in the form of an actuating rod with a ball head formed on it, a second component that is part of the brake booster and has an insertion opening with an annular groove, and a radially elastic securing ring, which can be snapped into the annular groove acting as a detent that keeps the ball head in the insertion opening. The ball head has a very complicated shape. To insert the securing ring into the insertion opening and displace it until it locks into place in the annular groove, a complicated assembly tool is needed. This makes automatic assembly difficult. Furthermore, this ball joint can be used only if it is still accessible to the assembly tool after the brake booster has been installed. In a ball joint disclosed by U.S. Pat. No. 3,733,966, the insertion opening is funnel-like near its beginning. This facilitates insertion of the securing ring. Once again, however, a special assembly tool is needed. This ball joint is again usable only if it is still accessible to an assembly tool after the brake booster has been installed in a vehicle. It accordingly became an object to provide an improved ball joint.

OBJECT AND SUMMARY OF THE INVENTION

The ball joint according to the invention has the advantage that the securing ring can be introduced together with the ball head into the insertion opening, which does not require a special assembly tool. As a result, the brake booster can be assembled without the rod-like component, in front of a vehicle firewall then the rod-like component, which has the ball head, can be introduced into the passenger compartment of the vehicle by a robot, together with a component assembly including a pedal, and fastened to the other side of the firewall, the ball joint being simultaneously assembled in this process.

The provisions set forth preclude canting and seizing during insertion of the sleeve into the insertion opening, which prevents damage to component parts. Other provisions promote self-alignment of the sleeve relative to the longitudinal axis of the insertion opening. As set forth an exemplary embodiment shown cannot be disassembled and will therefore be destroyed if an attempt is made to disassemble it by force, for example by breaking the ball head off its rod-like component. This prevention of disassembly is desirable for safety reasons; it also prevents improper reassembly.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the ball joint according to the invention.

DESCRIPTION OF THE PREFERRED EMBODIMENT

The ball joint 2 includes a first component 3, a second component 4, a securing ring 5 and a sleeve 6.

The component 3 is substantially rod-like in embodiment and has a thread 7 on one end by means of which it is screwed into a tappet 8, for instance. The tappet 8 is articulatedly connected to a brake pedal lever, not shown. This brake pedal lever is part of a pedal assembly, also not shown. On the opposite end, a ball head 9 is integrally formed onto the rod-like component 3. In the area immediately adjacent to the ball head, to provide good swivelability, the rod-like component 3 has a section 10 of smaller diameter and the ball head has a radius R1.

The second component 4 is part of a brake booster, not shown, and has an insertion opening 11. At its open end, the insertion opening 11 has a curved funnel-like restriction 12, which is adjoined by a cylindrical bore 13. The funnel-like restriction 12 may for example be conical in shape, or as shown in the drawing, it may be rounded. The rounding, having a radius R2, has centers of curvature located on a circle outside the funnel-like restriction 12. Near the funnel-like restriction 12 in the cylindrical bore 13, an annular groove 14 is machined into the second component 4, beginning at the cylindrical bore 13. A thrust piece 15 is built into the second component 4, pointing toward the ball head 9, with which it forms an articulated thrust connection; the thrust piece 15 is attached to a rod 15'. The thrust piece 15 is fixed in a smaller cylindrical portion than cylinder 13 in the component 4 by a wire ring 16, for example. The thrust piece 15 serves to transmit forces via the rod 15' and for instance via a travel simulator, not shown, to a brake valve of the brake booster, and in an emergency braking operation to a booster piston, which in turn is capable of displacing at least one master cylinder piston.

The sleeve 6 receives the unattached ball head 9 and in an articulated manner and is inserted into the second component 4. In the vicinity of the ball head 9, the sleeve 6 has a first longitudinal section A1, which is adjoined toward the funnel-like restriction 12 by a second longitudinal section A2 and finally by a third longitudinal section A3. The longitudinal section A1 has a spherically curved outer contour 17 having the radius R3. The center of curvature K3 of this outer contour 17 is located in the longitudinal axis of the sleeve 6. From the center of curvature K1 of the ball head 9 having the radius R1, the center of curvature K3 is spaced apart, toward the funnel-like restriction 12, by a distance B. The radius R3 is selected to be large enough that the sleeve 6, with its longitudinal section A1, rests substantially without play in the cylindrical bore 13. The second longitudinal section A2 likewise has a spherically curved outer contour 18. Between the outer contours 17 and 18 there is a rounded transition 19. The outer contour 18 has a radius of curvature R4, which for example is the same length as the radius R3. The third longitudinal section A3 is cylindrical and has an annular groove 20 on its circumference. The annular groove 20 has a groove flank 21, which for example forms a conical jacket. This conical jacket encompasses an angle on the order of magnitude of 80°, for example. The angle opens toward the ball head 9. The third longitudinal section A3 is still within the cylindrical bore 13. Alternatively to the sleeve 6 shown, the longitudinal sections A2 and A3 could also have a larger diameter than the longitudinal section A1. Then, instead of the cylindrical bore 13, there would be a stepped bore, the larger diameter of which would begin at the funnel-like restriction 12.

The ball joint 2 is assembled as follows: first, the rod-like component 3 is inserted, with the thread 7 leading, into the sleeve 6. The sleeve 6, which differs from what is shown, has a sleeve end 22, which in its original state is cylindrical on the inside, so that the ball head 9 as well can be inserted into the sleeve 6. After the insertion, by rolling in the sleeve end 22, the shape shown in the drawing is attained. As a result, the sleeve end 22 grips the ball head 9 like a ball cup, so that the ball head can no longer get out of the sleeve end 22. Then the securing ring 5, which for example is of spring steel wire and in its original state has an outer diameter at least equal to the diameter of the annular groove 14 of the component 4, is slipped over the sleeve until it finds accommodation in the annular groove 20 of the sleeve 6. In this state, the securing ring 5 protrudes radially out of the annular groove 20. As a result, the component 3 along with its ball head 9, the sleeve 6 and the securing ring 5 are prepared for being joined to the component 4. Now the brake booster (not shown), to which the component 4 belongs can be secured to the passenger side of a motor vehicle bulkhead. As already mentioned, the tappet 8 is part of an assembly unit that includes pedals, which is to be installed in a passenger compartment and secured on the above-mentioned bulkhead opposite the brake booster. This assembly unit may be moved toward the bulkhead by hand or by means of a robot, for example, in alignment with the brake booster, and secured there. In this process, the longitudinal section A1 of the sleeve 6 first meets the funnel-like restriction 12 of the insertion opening 11. Because the center of curvature K1 of the ball head is located before the center of curvature K3 of the longitudinal section A1, as seen in the insertion direction, no problematic canting forces arise at the sleeve 6 during the insertion. The spherical outer contour 17 assures that the sleeve 6 will not seize in the cylindrical bore 13, even if its longitudinal axis does not match the longitudinal axis of the component 4. Upon further insertion of the sleeve 6 into the insertion opening 11, the second longitudinal section A2 finally comes into contact with the funnel-like restriction 12. As a result, the longitudinal axis of the sleeve 6 is aligned coaxially with the longitudinal axis of the insertion opening 11. Finally, the sleeve 6 plunges so far into the cylindrical bore 13 that the securing ring 5, which has been radially compressed during the insertion of the sleeve 6 into the insertion opening 11, locks into the detent formed by the annular groove 14 of the component 4. The distance spacing the annular groove 14 apart from the thrust piece is selected in such a way, taking the selected dimensions of the sleeve 6 and the ball head 9 into consideration, that the ball head 9 does not touch the thrust piece 15 until it is assured that the securing ring 5 has been displaced so far, by means of the sleeve 6 via a groove flank 23 of the annular groove 20, that it reliably locks into place in the annular groove 14 of the component 4. Thrust forces arising during operation are predominantly transmitted via the ball head 9 to the thrust piece 15, which is embodied in the manner of a ball cup. As a result, the sleeve 6 can be embodied as relatively thin-walled, in particular in the vicinity of its sleeve end 22, and hence so as to save space. The sleeve end 22 can therefore be readily adapted to the contour of the ball head 9 by rolling or pressing.

As already mentioned, thrust forces acting upon the ball head 9 via the rod-like component 3 are transmitted by the ball head 9 via the thrust piece 15 on to the brake booster or to its brake valve. If the component 3 is engaged by tensile forces, then the ball head 9 displaces the sleeve 6, with its groove flank 21, against the securing ring 5, which meets with resistance in the annular groove 14 of the component 14. Because the groove flank 21 is embodied like a conical jacket, this groove flank 21 acts upon the securing ring 5 in such a manner as to spread it open, pressing it against the bottom of the annular grooves 14. This prevents the securing ring 5 from deflecting into the annular groove 20, with the advantage that the sleeve 6 and accordingly the ball head 9 cannot be removed from the component 4. As a result, the ball joint 2 is always functional. Furthermore, disassembly of the ball joint 2 without destroying some of the components is impossible. As a result, it is practically impossible to reassemble the ball joint 2 either. This is desirable for safety reasons, since the possibility that untrained persons may perform maintenance or repair work in repair facilities cannot be precluded.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A ball joint for actuating a brake booster, having a first, substantially rod-like component with a ball head; having a second component (4) that has an insertion opening (11) tapering in funnel-like fashion near its opening, an annular groove in said second component spaced apart from the opening, a radially elastic securing ring, which is insertable into the insertion opening and which can be snapped into place in the said annular groove to secure said ball head from being removed from said insertion opening, characterized in that a substantially cylindrical sleeve portion (6) is deformed about the ball head (9), and surrounds the ball head (9) in an articulated and undetachable manner, an annular groove on the circumference of said sleeve, a securing ring (5) located in said annular groove and said ball head (9) is insertable along with the sleeve (6) far enough into the insertion opening (11, 12, 13) such that the securing ring (5) locks into place in said annular groove (14) in the surface of said second component (4).

2. A ball joint as defined by claim 1, characterized in that at least in a region near the ball head (9), said insertion opening (11) of said second component (4) is embodied as a cylindrical bore (13), with the sleeve (6), in a longitudinal section (A1) located in said cylindrical bore via a vicinity of said bore 13 has an approximately spherically curved outer contour (17), the center of curvature (K3) of which is located in the longitudinal axis of the sleeve (6) and is spaced apart from the center of curvature (K1) of the ball head (9) toward the beginning of the insertion opening (11) by a distance (B).

3. A ball joint as defined by claim 2, characterized in that adjoining the longitudinal section (A1) in the direction toward the beginning of the insertion opening (11) is a further longitudinal section (A2) having a substantially spherically curved outer contour (18), which continues as a cylindrical longitudinal section (A3), into which the annular groove (20) is machined, and that the insertion opening (11) is also cylindrically embodied in the vicinity of the cylindrical longitudinal section (A3).

4. A ball joint as defined by claim 1, characterized in that after the insertion of the ball head (9) into the sleeve (6), a sleeve end (22) located at the first longitudinal section (A1) is shaped onto the ball head (9), at least partly surrounding the ball head (9).

5. A ball joint as defined by claim 2 characterized in that after the insertion of the ball head (9) into the sleeve (6), a sleeve end (22) located at the first longitudinal section (AL) is shaped onto the ball head (9), at least partly surrounding the ball head (9).

6. A ball joint as defined by claim 3 characterized in that after the insertion of the ball head (9) into the sleeve (6), a sleeve end (22) located at the first longitudinal section (AL) is shaped onto the ball head (9), at least partly surrounding the ball head (9).

7. A ball joint as defined by claim 3, characterized in that the annular groove (20) of the sleeve (6) has a groove flank (21) substantially forming a conical jacket, wherein the conical jacket opens in the direction toward the first longitudinal section (A1) of the sleeve (6), with an angle preferably on the order of magnitude of 80°.

* * * * *